US00RE35437E

United States Patent [19]

Ascone

[11] E Patent Number: Re. 35,437

[45] Reissued Date of Patent: Feb. 4, 1997

[54] MILK AND CEREAL CONTAINER

[76] Inventor: David Ascone, 2115 Caton, Apt. 1, Chicago, Ill. 60647

[21] Appl. No.: 390,512

[22] Filed: Feb. 17, 1995

Related U.S. Patent Documents

Reissue of:

[64] Patent No.: 5,241,835
Issued: Sep. 7, 1993
Appl. No.: 998,547
Filed: Dec. 30, 1992

[51] Int. Cl.[6] ..... F25D 3/08

[52] U.S. Cl. ..... 62/372; 62/457.6; 99/516; 220/501; 426/109; 426/120

[58] Field of Search ..... 62/457.6, 457.2, 62/371, 372; 220/501, 502, 503, 574, 574.1, 575, 556; 99/516, 517; 137/576; 426/109, 120

[56] References Cited

U.S. PATENT DOCUMENTS 4,989,419 2/1991 Brando et al. ..... 62/457.6
5,167,973 12/1992 Snyder ..... 220/501

*Primary Examiner*—John M. Sollecito
*Attorney, Agent, or Firm*—Bullwinkel Partners, Ltd.

[57] ABSTRACT

A milk and cereal container comprises built-in milk and cereal compartments and an optional detachable spoon. At least one freeze pack adjacent the milk compartment keeps the milk cold until ready for consumption. A valve interposed between the milk and cereal compartments controls the flow of milk into the cereal compartment, and keeps the cereal and milk separate until the user is ready to eat. The container is washable and reusable.

6 Claims, 4 Drawing Sheets

MILK AND CEREAL CONTAINER

Matter enclosed in heavy brackets [ ] appears in the original patent but forms no part of this reissue specification; matter printed in italics indicates the additions made by reissue.

BACKGROUND

1. Field of the Invention

This patent relates to food containers. More particularly, this patent relates to a container for holding milk and cereal in separate compartments until ready for consumption.

2. Description of the Related Art

It is an axiom that breakfast is the most important meal of the day. However, many persons no longer have the time to sit down and eat a balanced healthy breakfast. The present invention is a milk and cereal container having a removable freeze pack and designed to be filled with milk and cereal, placed in one's briefcase, backpack, purse, lunchbox, etc., and carried until the user is ready to eat. The present invention enables the user to eat a healthy meal of cold milk and crunchy cereal at his or her convenience.

Containers for holding milk and cereal can be found in the prior art. For example, Keck U.S. Pat. No. 4,558,804 describes a carousel type appliance in which milk is held in a lower chamber and cereal is held in an upper carousel. The user rotates the carousel which releases a measured amount of cereal and sips the milk from the lower chamber.

Sullivan U.S. Pat. No. 4,625,882 describes a toy-like device in which the milk and cereal are mixed together by dumping the milk from a pivotally supported bucket into a boatlike cereal holder. Davis U.S. Pat. No. 4,986,433 describes a serving piece in which cereal is shovelled down a spout into a bowl in which milk is held.

None of the prior art patents discloses a milk and cereal container which can be easily transported. Furthermore, none discloses a container which keeps milk cold until use. Therefore, there exists a need for a milk and cereal container which holds milk and cereal in separate compartments until ready to be consumed, can be easily transported, and keeps the milk cold until ready to use.

SUMMARY OF THE INVENTION

The present invention is a container for milk and cereal comprising a milk reservoir and a cereal compartment. The milk reservoir is preferably located at one end of the container. At least one freeze pack adjacent to the milk reservoir keeps the milk cold until ready for consumption. The cereal compartment is located at the end of the container opposite the milk reservoir and has an opening and a cover removably secured over the opening. The container comprises at least one valve interposed between the milk reservoir and the cereal compartment which may be opened when the consumer is ready to introduce milk into the cereal compartment. In the preferred embodiment, a spoon compartment adjacent the milk reservoir contains a detachable spoon.

It is an object of the present invention to provide a container which holds milk and cereal in separate compartments until ready to be consumed.

A further object is to provide a container for milk and cereal which can be easily transported.

A still further object is to provide a container for milk and cereal which keeps the milk cold until use.

THE DRAWINGS

DETAILED DESCRIPTION OF THE INVENTION

Figure 1:
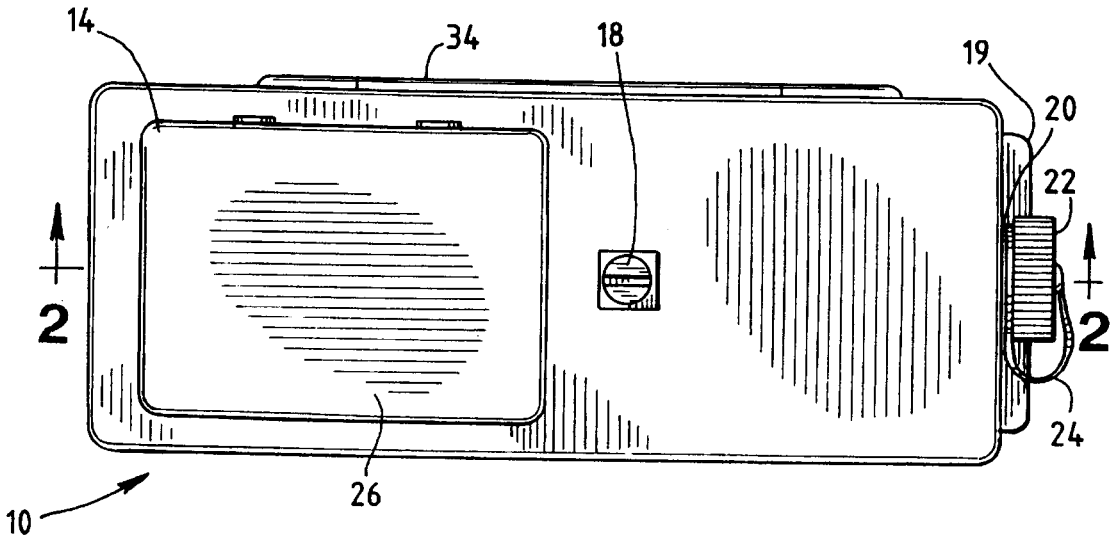
FIG. 1 is a top view of the milk and cereal container of the present invention.

Turning to the drawings, there is shown in FIGS. 1 to 4 a milk and cereal container 10 according to the present invention. The container 10 comprises a milk reservoir 12 and a cereal compartment 14. In the preferred embodiment, the milk reservoir 12 is located at one end of the container 10 and the cereal compartment 14 is located at the other end of the container 10. A freeze pack 16 is located adjacent to the milk reservoir 12 is filled with a freezable material to keep the milk cold until ready for consumption. The freeze pack 16 may be removable or may be integrated into the container 10. If a removable freeze pack 16 is used, the freeze pack is held in a freeze pack compartment 17. A freeze pack compartment cap 19 is used to cover the freeze pack compartment opening.

A valve 18 interposed between the milk reservoir 12 and the cereal compartment 14 may be turned to either a closed position for keeping the milk and cereal separate or an open position for introducing the milk into the cereal compartment 14. The valve 18 may be opened and closed by hand.

The milk reservoir 12 has a fill opening 20 located at one end of the container 10. A cap 22 is used to cover the opening 20 after the reservoir 12 is filled with milk. The cap 22 may be a snap-on type cap, screw cap, or other suitable cap. Preferably, the cap 22 is attached to the container 10 by a short, flexible plastic line 24.

Figure 2:
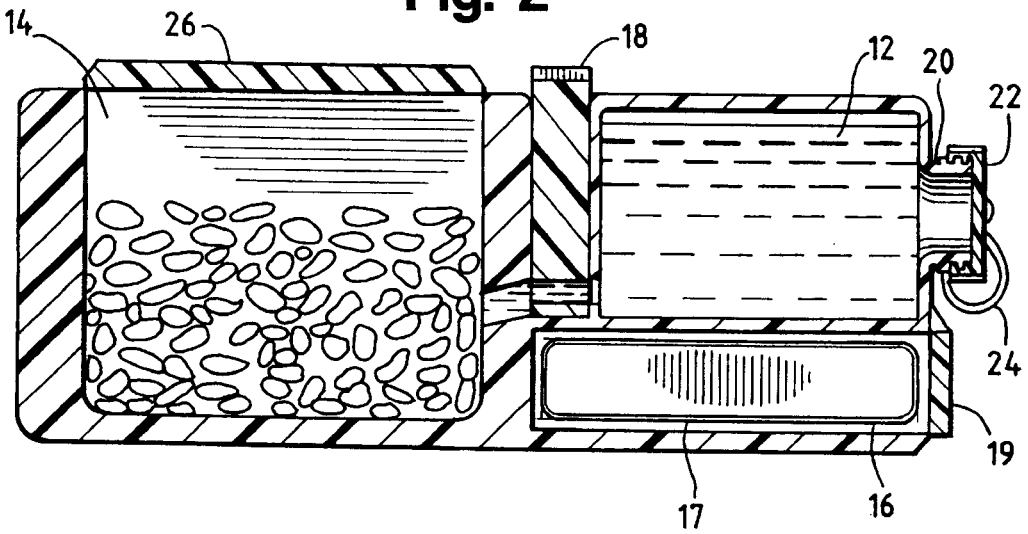
FIG. 2 is a cross-sectional view of the milk and cereal container of FIG. 1 taken along line 2—2 of FIG. 1 and shown containing milk and cereal.
Figure 3:
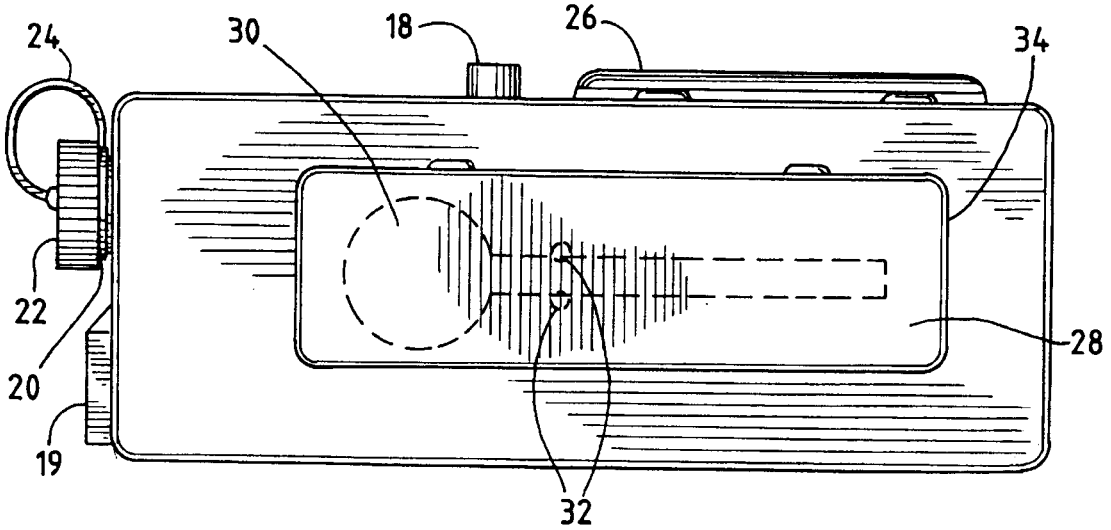
FIG. 3 is a right side view of the milk and cereal container of FIG. 1 shown with the spoon compartment lid in place and the detachable spoon shown in phantom line.
Figure 4:
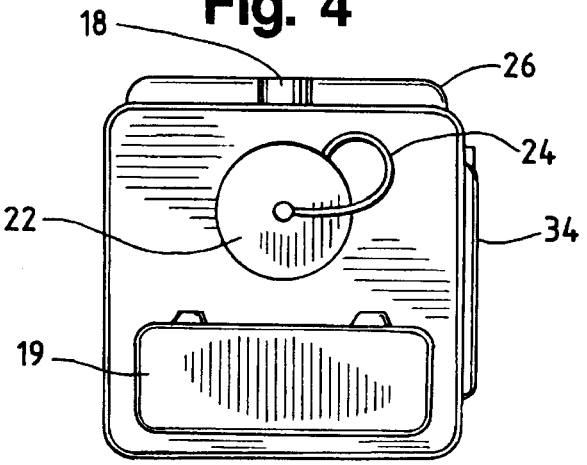
FIG. 4 is a front view of the milk and cereal container of FIG. 1.
Figure 5:
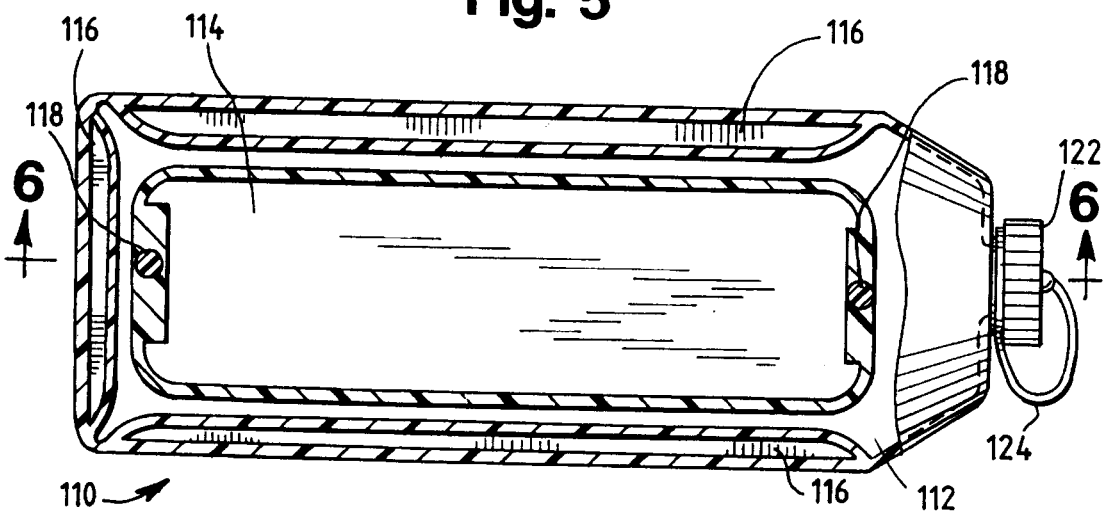
FIG. 5 is a top view of an alternative embodiment of the milk and cereal container of the present invention, shown without the removable cereal compartment lid and in partial cutaway view to show the integrated freeze packs.

The cereal compartment 14 has a lid 26 which may be removed to expose the cereal prior to eating. The lid 26 may be hinged or may snap on or slide on. A snap on lid 26 is shown in FIGS. 2, 3 and 4.

The preferred embodiment comprises a spoon compartment 28 and a spoon 30. The spoon 30 is held in the spoon compartment 28 by a pair of plastic snap-type fasteners 32 for easy removal. A lid 34 may be used to cover the spoon compartment 28.

Preferably, the container 10, freeze pack compartment cap 17, fill cap 22, cereal compartment lid 26 and spoon 30 are formed of plastic to provide durable lightweight use and easy cleaning, although other suitable materials, such as stainless steel, are contemplated.

In the preferred embodiment, all parts of the milk and cereal container 10 except the spoon 30 are permanently attached to the container 10 to minimize the possibility of a lost part.

The present invention is used in the following manner. Prior to use, the freeze pack 16 is stored in a freezer until it reaches a suitable cold temperature. When ready to use, the user simply removes the freeze pack 16 from the freezer, inserts it into the freeze pack compartment 17, pours milk into the milk reservoir 12 and adds cereal to the cereal compartment 14. The user can then carry the container 10 with him or her until ready to eat. To eat, the user removes the cereal compartment lid 26, opens the valve 18 to mix the milk and cereal in the cereal compartment 14, and eats the milk and cereal with the detachable spoon 30. The spoon 30 and container 10 are washable and may be used repeatedly.

FIGS. 5 to 8 disclose an alternative embodiment of the milk and cereal container 110 according to the present invention. In the alternative embodiment, the milk reservoir 112 is located around the perimeter of the container 110 and the cereal compartment 114 is located in the center of the container 110. Freeze packs 116 located adjacent to the milk reservoir 112. The freeze packs 116 are integrated into the container 110.

Valves 118 interposed between the milk reservoir 112 and the cereal compartment 114 may be turned to either a closed position for keeping the milk and cereal separate or an open position for introducing the milk into the cereal compartment 114.

The milk reservoir 112 has a fill opening 120 located at one end of the container 110. A cap 122 is used to cover the opening 120 after the reservoir 112 is filled with milk. The cap 122 is attached to the container 110 by a short, flexible plastic line 124.

Figure 6:
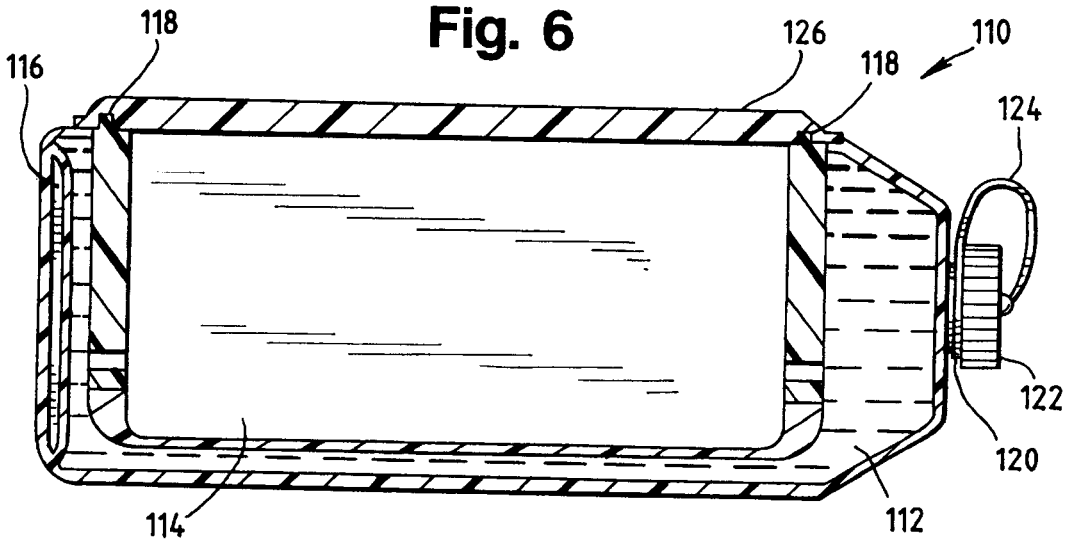
FIG. 6 is a cross-sectional view of the milk and cereal container of FIG. 5 taken along line 6—6 of FIG. 5.
Figure 7:
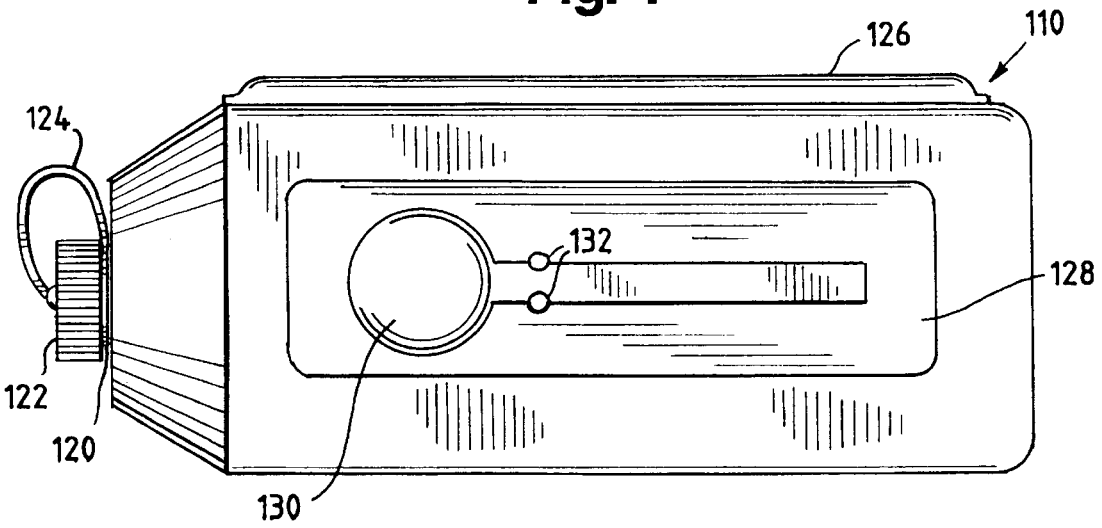
FIG. 7 is a right side view of the milk and cereal container of FIG. 5 shown without the spoon compartment lid to reveal the spoon compartment and detachable spoon.
Figure 8:
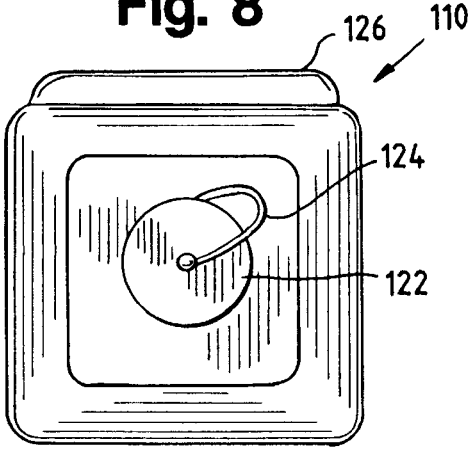
FIG. 8 is a front view of the milk and cereal container of FIG. 5.

The cereal compartment 114 has a lid 126 which may be removed to expose the cereal prior to eating. The lid 126 may be hinged or may snap on or slide on. A snap on lid 126 is shown in FIGS. 6, 7 and 8.

The alternative embodiment also comprises a spoon compartment 128 and a spoon 130. The spoon 130 is held in the spoon compartment 128 by a pair of plastic snap-type fasteners 132 for easy removal.

Other modifications and alternative embodiments of the invention are contemplated which do not depart from the spirit and scope of the invention as defined by the foregoing teachings and appended claims. For example, instead of being located on the front side of the container, the freeze pack cap may be located on top of the container.

I claim as my invention:

1. A container for milk and cereal comprising:

a milk reservoir having an opening and a resealable fluid-tight cap means removably secured over said opening [and fastened to said container];

at least one freeze pack adjacent to the milk reservoir and filled with a freezable substance;

a cereal compartment adjacent the milk reservoir and having an opening and a cover removably secured over the cereal compartment opening; and at least one valve interposed between the milk reservoir and the cereal compartment, said at least one valve having a closed position for keeping the milk and cereal separate and an open position for allowing the milk to enter the cereal compartment.

2. The milk and cereal container of claim 1 further comprising a spoon compartment adjacent the milk reservoir adapted to contain a detachable spoon.

3. The milk and cereal container of claim 2 wherein the container, cap means, cover and spoon are formed of plastic.

4. A plastic container for milk and cereal comprising:

a milk reservoir located at one end of the container and having an opening and a resealable fluid-tight cap means removably secured over said opening [and fastened to said container by a flexible plastic line];

a plurality of freeze packs adjacent to the milk reservoir and filled with a freezable substance;

a cereal compartment located at the end of the container opposite the milk reservoir and having an opening and a cover removably secured over the cereal compartment opening;

at least one valve interposed between the milk reservoir and the cereal compartment, said at least one valve having a closed position for keeping the milk and cereal separate and an open position for allowing the milk to enter the cereal compartment; and a spoon compartment adjacent the milk reservoir and containing therein a detachable spoon.

5. A plastic container for milk and cereal comprising:

a milk reservoir located around the perimeter of the container and having an opening and a cap removably secured over said opening [and fastened to said container by a flexible plastic line];

a plurality of freeze packs adjacent to the milk reservoir and filled with a freezable substance;

a cereal compartment located substantially in the center of the container and having an opening and a cover removably secured over the cereal compartment opening;

at least one valve interposed between the milk reservoir and the cereal compartment, said at least one valve having a closed position for keeping the milk and cereal separate and an open position for allowing the milk to enter the cereal compartment; and a spoon compartment adjacent the milk reservoir adapted to contain a detachable spoon.

*6. The container of claim 1 wherein the resealable fluid-tight is fastened to said container.*

* * * * *

UNITED STATES PATENT AND TRADEMARK OFFICE

CERTIFICATE OF CORRECTION

PATENT NO. : RE 35,437

DATED : February 4, 1997

INVENTOR(S) : Ascone

It is certified that error appears in the above-indentified patent and that said Letters Patent is hereby corrected as shown below:

Claim 6, line 55, after "fluid-tight" insert --cap--.

Signed and Sealed this

Twenty-ninth Day of April, 1997

*Attest:*

*Attesting Officer*

Bruce Lehman

BRUCE LEHMAN

*Commissioner of Patents and Trademarks*